United States Patent
El-Wardany et al.

(10) Patent No.: US 12,109,585 B2
(45) Date of Patent: Oct. 8, 2024

(54) HYBRID LASER SURFACE PROCESSING AND SPRAY COATING SYSTEM

(71) Applicant: RTX Corporation, Farmington, CT (US)

(72) Inventors: Tahany El-Wardany, Vernon, CT (US); Timothy C. Davenport, South Windsor, CT (US); Thomas P. Filburn, Granby, CT (US); Eric W. Stratton, Mansfield, TX (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/072,935

(22) Filed: Dec. 1, 2022

(65) Prior Publication Data

US 2024/0181492 A1    Jun. 6, 2024

(51) Int. Cl.

| | |
|---|---|
| *B05D 3/06* | (2006.01) |
| *B05B 17/06* | (2006.01) |
| *B05D 5/00* | (2006.01) |
| *B05D 5/02* | (2006.01) |
| *B23K 26/352* | (2014.01) |
| *B23K 26/36* | (2014.01) |

(Continued)

(52) U.S. Cl.
CPC .............. *B05D 3/06* (2013.01); *B05B 17/06* (2013.01); *B05D 3/062* (2013.01); *B05D 3/065* (2013.01); *B05D 5/005* (2013.01); *B05D 5/02* (2013.01); *B23K 26/355* (2018.08); *B23K 26/36* (2013.01); *B25J 15/0019* (2013.01); *F01D 5/005* (2013.01)

(58) Field of Classification Search
USPC ........................................ 427/554, 555, 556
See application file for complete search history.

(56) References Cited

U.S. PATENT DOCUMENTS

| | | | | |
|---|---|---|---|---|
| 5,688,564 | A | * | 11/1997 | Coddet ..................... C23C 4/02 427/427 |
| 5,916,625 | A | * | 6/1999 | Rosenberger ........ B05D 3/0486 118/663 |
| 9,592,541 | B2 | | 3/2017 | Bruck et al. |

(Continued)

FOREIGN PATENT DOCUMENTS

| | | | |
|---|---|---|---|
| CN | 108441854 A | | 8/2018 |
| CN | 110052714 A | * | 7/2019 ............. B23K 26/00 |

(Continued)

OTHER PUBLICATIONS

Extended European Search Report for EP Application No. 23213131.8, dated May 3, 2024, pp. 1-9.

*Primary Examiner* — Jose I Hernandez-Kenney
(74) *Attorney, Agent, or Firm* — CANTOR COLBURN LLP

(57) ABSTRACT

Methods and systems for treating components are described. The methods include using a system having a controller, a laser applicator, a coating applicator, and a sensor array. The laser applicator, the coating applicator, and the sensor array are arranged on a treatment arm that is controlled by the controller. The method includes scanning a surface to be treated of the component using the sensor array, cleaning the surface to be treated using the laser applicator, defining surface texture patterns, applying laser texturing, and applying a new coating to the surface to be treated using the coating applicator.

20 Claims, 6 Drawing Sheets

(51) Int. Cl.
  *B25J 15/00*   (2006.01)
  *F01D 5/00*   (2006.01)

(56) References Cited

U.S. PATENT DOCUMENTS

| | | |
|---|---|---|
| 10,801,098 B2 | 10/2020 | Hanson et al. |
| 2008/0085368 A1* | 4/2008 | Gauthier ............ B23K 26/0876 |
| | | 427/595 |
| 2017/0321316 A1* | 11/2017 | Barron ................... C23C 18/32 |
| 2018/0044771 A1* | 2/2018 | Strock ....................... C23C 4/02 |
| 2019/0022698 A1* | 1/2019 | Harner ................... B05D 5/005 |
| 2019/0024256 A1 | 1/2019 | Riehl et al. |
| 2022/0126319 A1* | 4/2022 | Richardson ........ G05B 13/0265 |
| 2022/0168786 A1* | 6/2022 | Meyler ................ B23K 26/032 |
| 2022/0236054 A1* | 7/2022 | Serruijs .................. C23C 18/06 |
| 2023/0061179 A1* | 3/2023 | Urena Pimentel ... C09D 175/04 |

FOREIGN PATENT DOCUMENTS

| | | | | |
|---|---|---|---|---|
| CN | 114054272 A | * | 2/2022 | |
| DE | 19720946 A1 | * | 11/1997 | ............ B05B 7/228 |
| FR | 2698885 A1 | | 6/1994 | |

* cited by examiner

HYBRID LASER SURFACE PROCESSING AND SPRAY COATING SYSTEM

BACKGROUND

The subject matter disclosed herein generally relates to treatments and coating of components and, more particularly, to systems for cleaning and applying coatings to surfaces.

Various components in a variety of industries may be coated with material coating that provide or operate as protective surfaces or finishes of the components. Implementation of hard coating and non-chromate coating systems for such components is being developed and advanced. Such coating operations can be used for initial coating of a component or for maintenance purposes, such as reapplying a protective coating. The components that may be treated by such processes may be used in aerospace, defense, automotive, power generation, and the like. However, removal and application of coatings during routine maintenance can result in the release of hazardous air pollutants, volatile organic compounds, and hazardous waste streams due to chemical stripping agents or abrasive media during coating removal and overspray due to spray coating processes. As such, improved coating systems may provide various advantages over existing systems.

SUMMARY

According to some embodiments, methods for treating components are provided. The methods employ a system having a controller, a laser applicator, a coating applicator, and a sensor array, wherein the laser applicator, the coating applicator, and the sensor array are arranged on a treatment arm that is controlled by the controller. The method includes scanning a surface to be treated of the component using the sensor array, cleaning the surface to be treated using the laser applicator, and applying a new coating to the surface to be treated using the coating applicator.

In addition to one or more of the features described herein, or as an alternative, further embodiments of the methods may include removing an existing coating on the component, using the laser applicator, prior to the cleaning.

In addition to one or more of the features described herein, or as an alternative, further embodiments of the methods may include that the cleaning is performed using a first energy application of the laser applicator and the removing of the existing coating is performed using a second energy application of the laser applicator that is different from the first energy application.

In addition to one or more of the features described herein, or as an alternative, further embodiments of the methods may include texturing the surface to be treated, using the laser applicator, after the cleaning and before the applying of the new coating.

In addition to one or more of the features described herein, or as an alternative, further embodiments of the methods may include that the cleaning is performed using a first energy application of the laser applicator and the texturing of the surface to be treated is performed using an energy application of the laser applicator that is different from the first energy application.

In addition to one or more of the features described herein, or as an alternative, further embodiments of the methods may include curing the new coating using the laser applicator.

In addition to one or more of the features described herein, or as an alternative, further embodiments of the methods may include that the cleaning is performed using a first energy application of the laser applicator and the curing of the new coating is performed using an energy application of the laser applicator that is different from the first energy application.

In addition to one or more of the features described herein, or as an alternative, further embodiments of the methods may include texturing the new coating using the laser applicator.

In addition to one or more of the features described herein, or as an alternative, further embodiments of the methods may include that the cleaning is performed using a first energy application of the laser applicator and the texturing of the new coating is performed using an energy application of the laser applicator that is different from the first energy application.

In addition to one or more of the features described herein, or as an alternative, further embodiments of the methods may include that the cleaning comprises applying a first energy application from the laser applicator to clean the surface to be treated. The method further includes removing a coating on the component by applying a second energy application that is different from the first energy application, after the scan and after the cleaning and curing the new coating by applying a third energy application that is different from the first energy application and the second energy application.

In addition to one or more of the features described herein, or as an alternative, further embodiments of the methods may include texturing the surface to be treated by applying an additional energy application after the removing of the coating and prior to applying the new coating, wherein the additional energy application is different from the first energy application, the second energy application, and the third energy application.

In addition to one or more of the features described herein, or as an alternative, further embodiments of the methods may include texturing the new coating by applying an additional energy application after applying the new coating, wherein the additional energy application is different from the first energy application, the second energy application, and the third energy application.

In addition to one or more of the features described herein, or as an alternative, further embodiments of the methods may include that the cleaning is performed using a pulsed laser.

In addition to one or more of the features described herein, or as an alternative, further embodiments of the methods may include that the applying of the new coating comprises an ultrasonic spray application.

According to some embodiments, systems for treating components are described. The systems include a treatment arm having a laser applicator, a coating applicator, and a sensor array, and a controller in operable communication with each of the laser applicator, the coating applicator, and the sensor array. The controller is configured to control the laser applicator and the coating applicator to perform a treatment operation of a surface of the component in response to information obtained from the sensor array. The treatment operation includes scanning a surface to be treated of the component using the sensor array, cleaning the surface to be treated using the laser applicator, and applying a new coating to the surface to be treated using the coating applicator.

In addition to one or more of the features described herein, or as an alternative, further embodiments of the systems may include that the treatment operation further includes removing an existing coating on the component prior to the cleaning using the laser applicator.

In addition to one or more of the features described herein, or as an alternative, further embodiments of the systems may include that the cleaning step is performed using a first energy application of the laser applicator and the removing of the existing coating is performed using a second energy application of the laser applicator that is different from the first energy application.

In addition to one or more of the features described herein, or as an alternative, further embodiments of the systems may include that the treatment operation includes at least one of texturing the surface to be treated after the cleaning and before the applying of the new coating and texturing the new coating after application thereof.

In addition to one or more of the features described herein, or as an alternative, further embodiments of the systems may include that the cleaning step is performed using a first energy application of the laser applicator and the texturing of the surface to be treated is performed using an energy application of the laser applicator that is different from the first energy application.

In addition to one or more of the features described herein, or as an alternative, further embodiments of the systems may include that the laser applicator is a pulsed laser applicator and the coating application is an ultrasonic spray applicator.

The foregoing features and elements may be combined in various combinations without exclusivity, unless expressly indicated otherwise. Features which are described in the context of separate aspects and embodiments may be used together and/or be interchangeable. Similarly, features described in the context of a single embodiment may also be provided separately or in any suitable subcombination. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Detailed descriptions of one or more embodiments of the disclosed apparatus and/or methods are presented herein by way of exemplification and not limitation with reference to the Figures.

Figure 1:
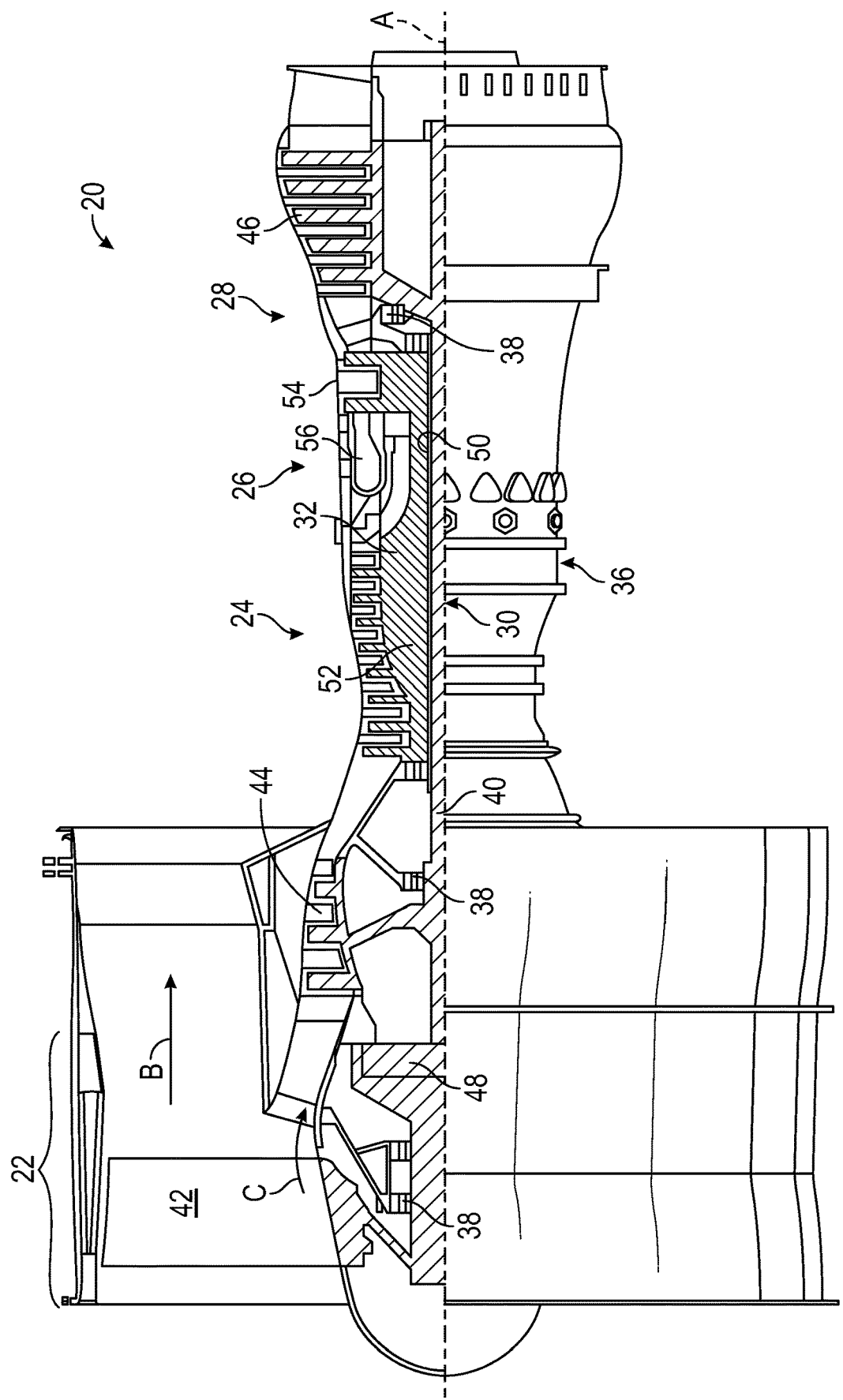
FIG. 1 is a schematic cross-sectional illustration of a gas turbine engine that may incorporate embodiments of the present disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 can be connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(514.7°\ R)]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets and turboshafts, wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

The gas turbine engine 20 includes various components within the sections thereof. For example, the fan, compressor, combustor, and turbine sections may include blades, vanes, panels, and the like which may require coatings for various purposes, including, but not limited to thermal protection, impact protection, improved part life, color applications, protection from radiation, protection from corrosion, etc. Further, although shown and described as a gas turbine engine for an aircraft, the components of the engines that may require such coating are not limited to aerospace applications. For example, turbines used in power generation may also benefit from coatings applied to components thereof. Additionally, outside of turbine engine applications, coatings may be applied to components in the automotive industry, defense industry, or other industries or systems that may require applied coatings to surfaces of components thereof. As such, the present disclosure is not intended to be limited to aerospace, and specifically gas turbine engines, but rather this is merely one example that may employ embodiments of the present disclosure.

Hard coating technologies and non-chromate coating systems have been used to both apply coatings to components during manufacture and for the purpose of recoating components during maintenance operations or the like. The removal and application of coating systems during routine maintenance may result in significant release of hazardous air pollutants (HAPs), volatile organic compounds (VOCs), and other hazardous waste streams due to the use of chemical stripping agents or abrasive media during coating removal and/or overspray resulting from different spray coating processes and techniques. Reduction of such hazardous waste streams is advantageous from various perspectives, including costs considerations, clean-up and enclosure techniques, and from environmental perspectives. In view of this, and under other considerations, embodiments of the present disclosure are directed to integrating various related techniques into an integrated robotic system to minimize the generation of hazardous waste streams during both coating removal and coating application. Such systems, as described herein, may be compatible with all chromate- and non-chromate-containing coatings in addition to hard coating systems.

Figure 2:
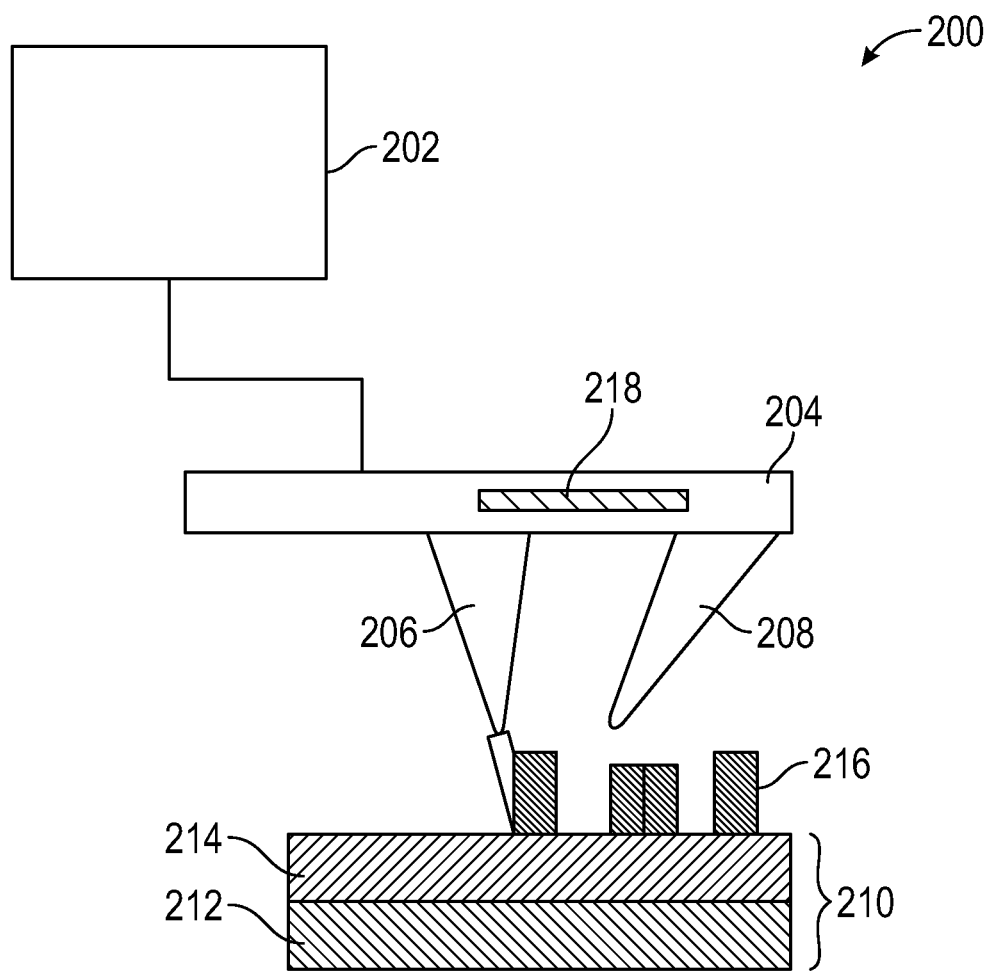
FIG. 2 is a schematic illustration of a component treatment system in accordance with an embodiment of the present disclosure.

Turning to FIG. 2, a schematic illustration of a hybrid laser and spray coating system 200 in accordance with an embodiment of the present disclosure is shown. The system 200 includes a controller 202 operably coupled to a treatment arm 204. The treatment arm 204 includes a laser applicator 206 and a coating applicator 208. In some configurations, the controller 202, treatment arm 204, laser applicator 206, and coating applicator 208 may be integrated into a single system, such as a robot or the like. In other embodiments, one or more of the components of the system 200 may be implemented as separate structures or components. However, it will be appreciated that in such configurations, the controller 202 may be used to control function and operation of the various components, as described herein. The system 200 may be configured to perform both cleaning and coating application to a component or the like.

In the illustrative embodiment of FIG. 2, a component 210 is arranged to be treated by the system 200. The component 210 includes a substrate 212 and a coating 214. The component 210 may be a used component and thus may include various debris or foreign matter 216 that may have collected thereon during use. During a maintenance operation, it may be useful to remove any foreign matter 216, and then remove the coating 214 to allow for a new coating to be applied to the substrate 212. As such, a used component may be processed to have a new coating applied thereto and thus product or part life may be improved. In this illustrative embodiment, the component 210 is a used component with the foreign matter 216 obtained from use of the component 210. However, it will be appreciated that the foreign matter 216 may represent variations in application of a coating during initial assembly or manufacture of the component 210, and thus embodiments described herein may be used for a treatment stage of a manufacturing process, and thus embodiments of the present disclosure are not intended to be limited to post-use maintenance operations.

The controller 202 may be configured to perform executable instructions, such as instructions stored in a memory or provided by a user from software or direct input. The controller 202 may be configured to direct power to the laser applicator 206 and/or the coating applicator 208 to cause operation thereof. The operation of the laser applicator 206 and the coating applicator 208 may be by selection operation, such that one or both of the laser applicator 206 and the coating applicator 208 may be operated individually or simultaneously. In FIG. 2, the laser applicator 206 and the coating applicator 208 are illustratively shown as mounted on the same treatment arm 204. In other embodiments, the treatment arm 204 may be arranged as two separate arms or structures, with each arm or structure having one of the laser applicator 206 or the coating applicator 208 arranged thereof. The single or multiple treatments arms 204 may be robotic arms with joints or the like to allow for multi-directional movement (e.g., within three dimensional space). Each applicator 206, 208 may be coupled to an appropriate power source to cause the respective applicator 206, 208 to be operated.

In one non-limiting example, the laser applicator 206 may be a laser or light source configured to emit radiation at one or more predetermined wavelengths, frequencies, amplitudes, and/or power levels. In some embodiments, the laser applicator 206 may be a pulsed laser. The coating applicator 208 may be a nozzle or the like that is fluidly coupled to a source of coating material, such as a hopper, supply chamber, or the like. The movement and position of each of the applicators 206, 208 may be controlled by movement of the treatment arm 204 and/or the controller 202. In some embodiments, rather than moving the applicators 206, 208, the component 210 may be mounted on a movable structure to cause movement of the component 210 relative to the applicators 206, 208. Further still, in some embodiments, a combination of movement of both the applicators 206, 208 and the component 210 may be used.

In one non-limiting configuration, the laser applicator 206 may be a nanosecond pulsed laser ablation system (e.g., 6 kilowatt-scale) capable of rapid removal of coatings without affecting underlying coatings and either crack a hard coating or generate only vaporized coating as chemical waste. Further, in an example configuration, an ultrasonic spray coating system capable of high coating quality and high transfer efficiencies that minimize the chemical use in coating applications may be employed. In some non-limiting examples, the ultrasonic spray coating may be performed using a liquid coating material fed to an ultrasonically vibrating nozzle. Using ultrasonic spray coating applications provides several benefits relative to pressure-fed spray coating systems including high transfer efficiencies (e.g., 85-90%, due to the low droplet velocities) and high coating uniformity (e.g., on the order of 10% thickness variation for a single pass which can be significantly improved with multiple passes, resulting from a spray containing small, uniform droplet sizes with highly disperse particles). Use of such laser applicator and ultrasonic spray coating may reduce hazard particulate generation during coating removal and new coating application as the applications will be concentrated on the surface and prevent spreading in the environment. As such, collection of particulate matter during removal or excess material during a spray application may be minimized and collected within a waste collector system.

In operation, the system 200 may provide for precision coating applications and coating removal applications by applying a feedback control system that includes a suite of sensors and detectors for monitoring operation thereof. For example, as shown in FIG. 2, the treatment arm 204 may include a sensor array 218. The sensor array 218 is configured in operably communication with the controller 202 to provide information regarding a treatment operation performed by the system 200. For example, the sensor array 218 may include optical sensors, radiation sensors (e.g., X-Ray, X-ray diffraction (XRD), X-ray fluorescence (XRF)), acoustic sensors, laser sensors (e.g., laser ultrasonic (LUS)) and the like, to measure various features, aspects, properties, and/or characteristics of the treatment operations, including scans of the component 210 (or the components thereof: substrate 212 and/or coating 214), the foreign matter 216, and any applied treatments and/or coatings that are added to the component 210 during a treatment operation using the system 200. The sensor array 218 may be a non-destructive testing (NDT) system, such as non-contact testing of surfaces to be treated. Although shown as integrated into the treatment arm 204, the sensor array 218 may be formed of distributed sensors not arranged as an array along the treatment arm 204 and/or may be arranged separate from the treatment arm 204, and may be arranged to image or scan the component 210 and/or the coatings and features thereof during a treatment operation.

The sensor array 218 may be configured as a compact suite of in situ X-ray- and acoustic-based sensors that are configured to monitor surface conditions, coating thickness, and thermal load during processing and treatment. Based on feedback from the sensor array 218, the controller 202 may utilize physics-based models to optimize control of the laser applicator 206 and the spray application 208 to perform a cleaning and coating application process to a given component 210. As such, the controller 202 may be configured in an active feedback loop with data obtained from the sensor array 218.

The coating applicator 208 may be a nozzle or similar spray head or device for applying particles of a coating to a surface of the component 210 (e.g., to the substrate 212, to a lower coating 214, or the like). The coating application can include, without limitation and for example only, chrome primers and both commercial and development-phase environmentally friendly non-chromate class N primers for corrosion protection to be applied to the component 212. Such components can include, without limitation, aircraft aluminum alloys for blades, vanes, panels, and the like. The system 200 is also compatible with any coating chemistry developed for traditional spray processes, and thus aerospace applications are not intended to be limiting, but rather are described for example and illustrative purposes only. The coating applicator 208 may be an ultrasonic spray applicator. In accordance with embodiments of the present disclosure, different ultrasonic resonant frequencies may be used to optimize the spray for different sized droplets as well as different nozzle designs for spray shaping, with such parameters selected for specific applications. The coating quality of the ultrasonic spray may be influenced by the specific chemistry (e.g., viscosity, solids fraction, and distribution of solids particle sizes) of the coating application as well as the desired precision and coating rate. In some non-limiting examples, a primer layer chemistry (or topcoat) may be coated using multiple different ultrasonic spray nozzles and frequencies because a single nozzle may not provide desired coating quality and thus, in accordance with some embodiments, the systems may incorporate a pair (or more) of spray nozzles that optimize for initial coating, coating growth, coating uniformity, and/or edge definition.

In the above system and example configuration thereof, a combination of a 6-kW nano-pulsed laser ablation system (laser applicator 206) is integrated with an ultrasonic spray coater (spray application 208) on a robotic platform (treatment arm 204 and controller 202) with controls based on an in situ sensor suite (sensor array 218) and physical modelling (e.g., onboard the controller 202). Various functions of the system 200 may include, without limitation, selective pulsed laser ablation removing only desired coating layers and efficient spray coating via ultrasonic spray application. Secondary functions of the system 200 may include, without limitation, laser cleaning of surfaces: laser texturing either before or after coating deposition: and immediate laser curing of deposited coatings for rapid formation of tack-free coatings. These secondary functions may be a result of the high precision of the system control and the unique combination of laser and ultrasonic spray functions enabled by embodiments of the present disclosure.

In some configurations, the controller 202 and the treatment arm 204 may be mounted on or part of a robot. Such a robot may include two arms (with both arms defining the treatment arm 204) using the laser applicator 206 (e.g., nanosecond pulsed laser), the coating applicator 208 (e.g., ultrasonic spray system), and a sensor array 218 (e.g., miniaturized sensor array). The controller 202 may include predictive physical models of the laser and spray processes which are incorporated into the controller 202 to operate as a robotic control system containing feedback control mechanisms based on feedback from the in-situ monitoring/sensing systems. In some non-limiting systems and operations, precision laser ablation methods can be applied to remove specific coating layer thickness (e.g., a single coating layer or portion of a coating layer). Further, the same laser system (laser applicator 206) can be used for texturing a surface before and/or after coating from the coating applicator 208, depending on the required function. In addition, the laser applicator 206 may be used for laser curing of a coating, for example, applied by the coating application 208.

The active feedback and in-process monitoring provided by the sensor array 218 can ensure that desired cleaning and coating application is achieved. For example, the sensor array 218 may be configured to actively monitor a surface that is to be cleaned, the surface once it is cleaned surface, and the surface once a coating layer has been applied. Such monitoring may ensure that the surface(s) are free from contaminants during a deposition process from the coating applicator 208 and that the thicknesses of both a de-coated and coated layer are uniformly distributed. In accordance with some embodiments, a miniaturized X-ray diffraction (XRD) system that is capable of simultaneously acquiring a complete 0-20 spectrum may allow for real-time analysis and monitoring of coating roughness and the existence of contamination. In addition, a laser-induced acoustic emission sensor system to real time monitoring of layer thickness variation is also used.

Referring now to FIGS. 3A-3F, schematic illustrations of a treatment process in accordance with an embodiment of the present disclosure. The schematic illustrations of FIGS. 3A-3F are simplified illustrations of a process performed using a system such as shown and described with respect to FIG. 2. The system includes a controller, a treatment arm(s), a laser applicator(s), a coating applicator(s), and a sensor array(s). Although the system of FIG. 2 is illustrated with various components in the singular form, those of skill in the art will appreciate that different laser applicators and/or coating applicators may be used in a single system, and thus multiple arms and/or associated sensors and components may be integrated into a complete system for performing a component treatment operation in accordance with embodiments of the present disclosure. As shown, a system 300 for performing a treatment operation in accordance with an embodiment of the present disclosure is shown. The system 300 includes a treatment arm 302 that may be operably controlled by a controller and may include various sensors, such as shown and described above. A laser applicator 304 and a coating applicator 306 are arranged on the treatment arm 302. The applicators 304, 306 are arranged to treat a component having a substrate 308 and a used coating 310 applied to the substrate 308. The used coating 310 may include foreign matter 312 thereon (e.g., particulates or the like acquired during use of the component to which the substrate 308 is a part). It will be appreciated that the substrate 308 may be a part of a component that is being treated or may be representative of a sub-coating layer that is below or beneath the used coating 310 and above a surface of a component having such multi-layer coating application. That is, the term substrate, as used herein, is not intended to be limited only to surface and parts of a component with coatings applied thereto but may also encompass sub-layers beneath another coating layer that is applied to a component to be treated.

Figure 3A:
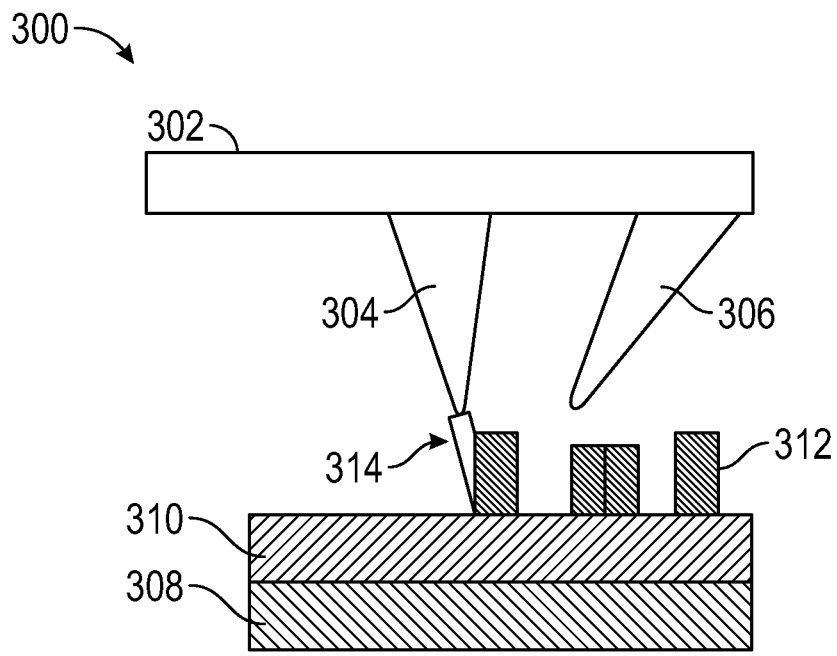
FIG. 3A is a schematic illustration of a cleaning step of a component treatment operation in accordance with an embodiment of the present disclosure.

In FIG. 3A, a first step of a treatment operation in accordance with an embodiment of the present disclosure is illustratively shown. At this first step of the treatment, the laser applicator 304 is operated to direct energy toward the used coating 310 to remove the foreign matter 312. The application of energy by the laser applicator 304 at the step of FIG. 3A may be at a first power level. The first power level may be selected for the purpose of removal of the foreign matter 312 without substantially or substantively impacting the used coating 310. As such, the energy or laser applied in FIG. 3A may be referred to a first energy application 314 from the laser applicator 304. The first energy application 314 may be controlled by a controller of the system 300 and/or the laser applicator 304 to have specific laser properties or characteristics to ensure that only the foreign matter 312 is removed, and the used coating 310 and/or the substrate 308 (or any intervening coating layers) are not impacted by the first energy application 314.

In some embodiments, prior to removing the foreign matter 312, the sensor array of the system may be used to scan the surfaces of interest to be treated, and thus a preliminary analysis regarding the amount and composition of the foreign matter may be obtained. As such, prior to directing energy from the laser applicator to the component, a scan may be performed using the sensor array to obtain information regarding the component or surfaces to be treated. This process may be referred to as laser cleaning. Once the foreign matter 312 is removed, the process may proceed to the operation of FIG. 3B.

Figure 3B:
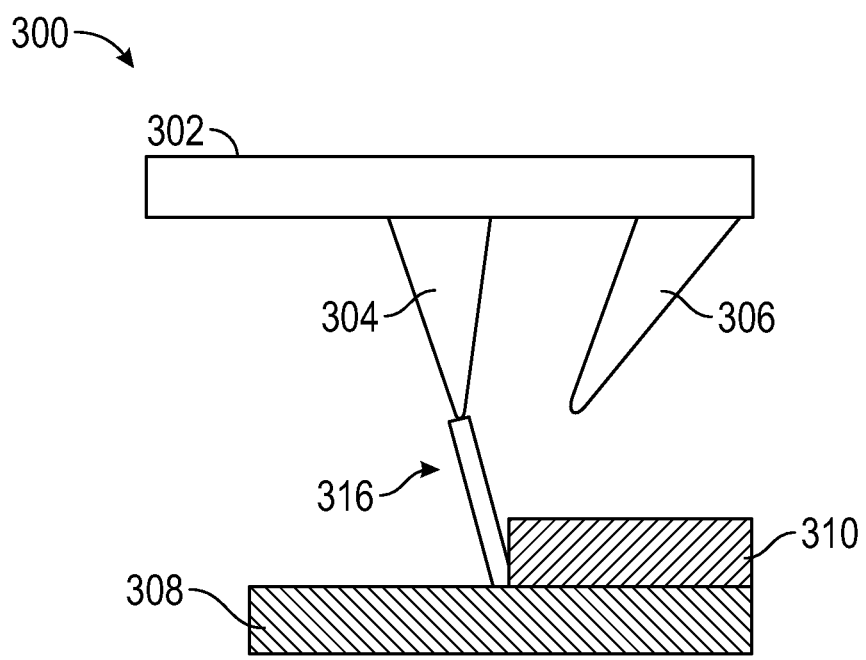
FIG. 3B is a schematic illustration of a coating removal step of a component treatment operation in accordance with an embodiment of the present disclosure.

As shown in FIG. 3B, a second energy application 316 may be performed using the laser applicator 304. The second energy application 316 may be performed at a different power level or using different laser properties to perform ablation to remove the used coating 310. The change in power levels or other properties of the laser may be controlled by an associated controller, as described above, or by other control mechanisms as will be appreciated by those of skill in the art. The change in laser properties may be a change in wavelength, amplitude, frequency, power, angle of application, or other change in property or characteristic that is selected to ablate the used coating 310. That is, the used coating 310 is removed from the substrate 308 by application of the second energy application 316. Similar to the first energy application 314, the second energy application 316 may be controlled to have specific laser properties or characteristics to ensure that only the used coating 310 is removed, and the substrate 308 (and/or any intervening coating layers between the substrate 308 and the used coating 310) are not impacted by the second energy application 314.

Figure 3C:
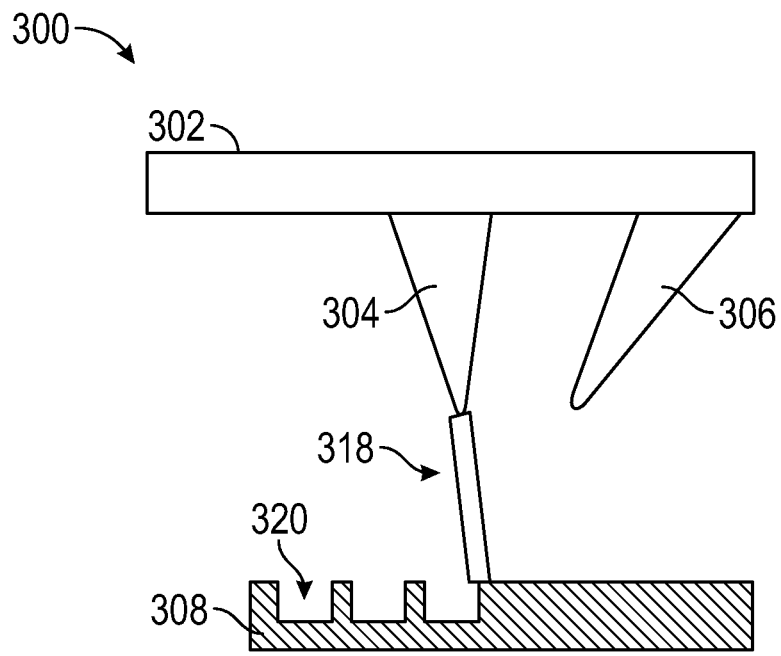
FIG. 3C is a schematic illustration of a texturing step of a component treatment operation in accordance with an embodiment of the present disclosure.

FIG. 3C illustrates an optional step of the process. As shown, in FIG. 3C, a third energy application 318 may be used to perform a laser texturing 320 of the substrate 308. The laser texturing 320 may be performed to ensure that a newly applied coating properly adheres or binds to the substrate 308. As such, the laser texturing 320 of FIG. 3C may be performed to increase a surface area of contact to which a new coating may be applied. As shown, a patterned texturing is formed through the laser texturing 320. However, any type of patterned or non-patterned texturing may be employed, such as merely increasing a surface roughness of the substrate 308.

Figure 3D:
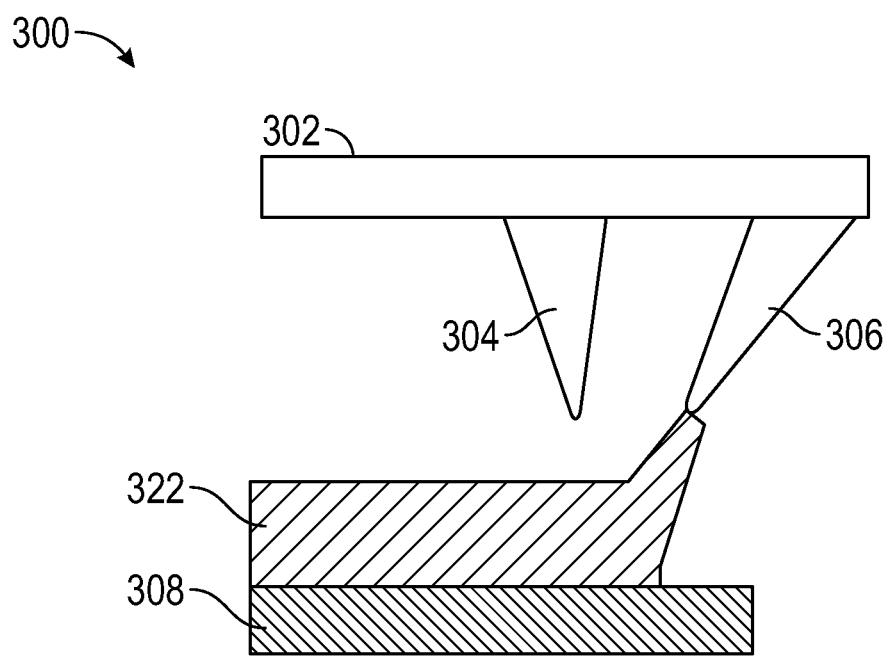
FIG. 3D is a schematic illustration of a coating application step of a component treatment operation in accordance with an embodiment of the present disclosure.

FIG. 3D illustrates application of a new coating 322 to the substrate 308 that has been cleaned of both the foreign matter 312 and the used coating 310. The new coating 322 is applied through the coating applicator 306. In some configurations and applications, the process may stop at this step, with the application of the new coating 322. However, in accordance with some embodiments, further steps may be performed using the system 300.

Figure 3E:
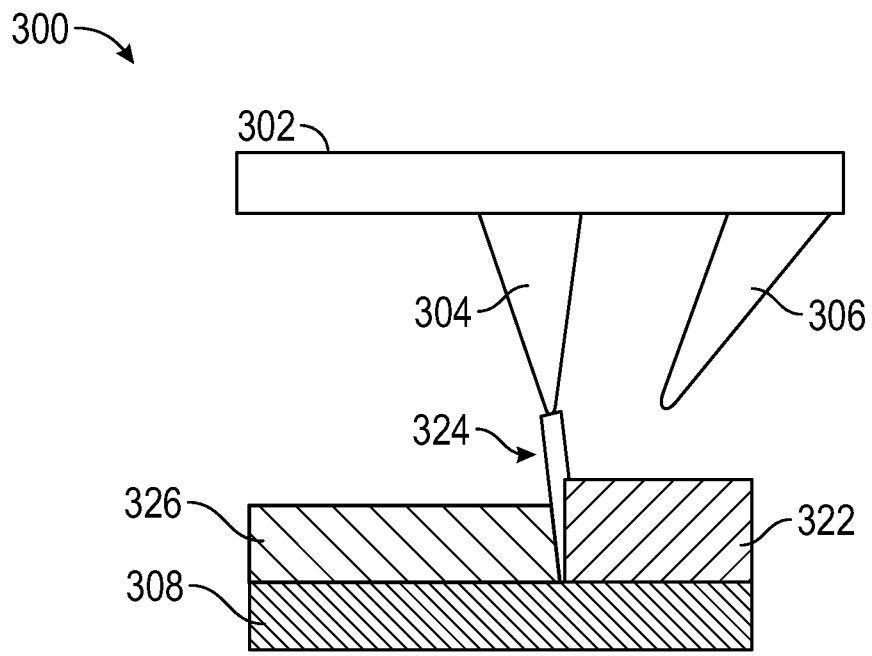
FIG. 3E is a schematic illustration of a curing step of a component treatment operation in accordance with an embodiment of the present disclosure.

For example, as shown in FIG. 3E, a laser curing step may be performed on the new coating 322. In FIG. 3E, a fourth energy application 324 is applied from the laser applicator 304. The fourth energy application 324 may be controlled to perform curing of the material of the new coating 322 to form a cured coating 326. The cured coating 326 may be the end of the process. The curing step of FIG. 3E may harden the material of the new coating 326 or may be used to trigger some other property of the new coating 326, such as causing a binder to fuse or the like.

Figure 3F:
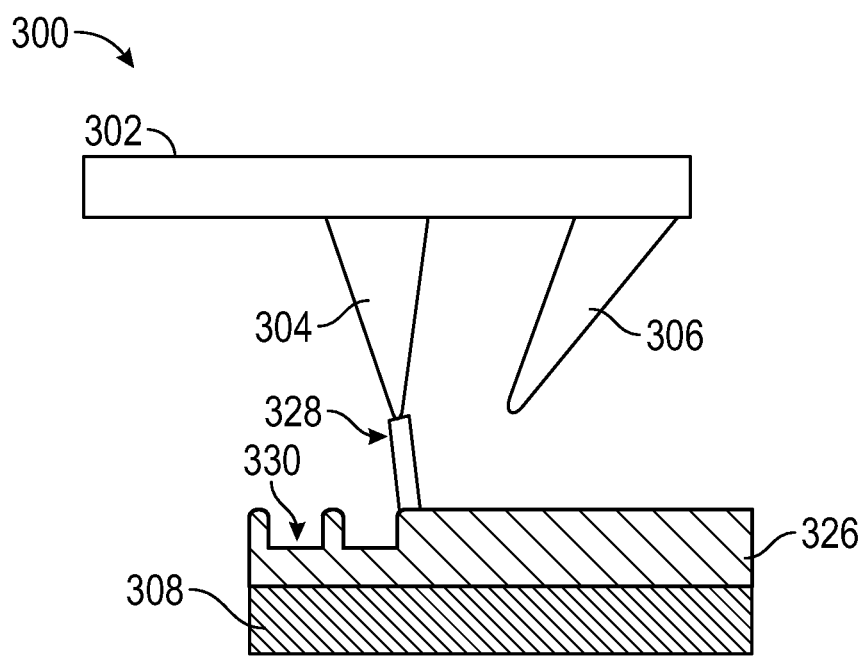
FIG. 3F is a schematic illustration of a texturing of a coating step of a component treatment operation in accordance with an embodiment of the present disclosure.

Finally, an optional post-curing process may be performed as shown in FIG. 3F. In FIG. 3F, a fifth energy application 328 may be performed using the laser applicator 304 to form a surface texture 330 in the new coating 326.

Figure 4:
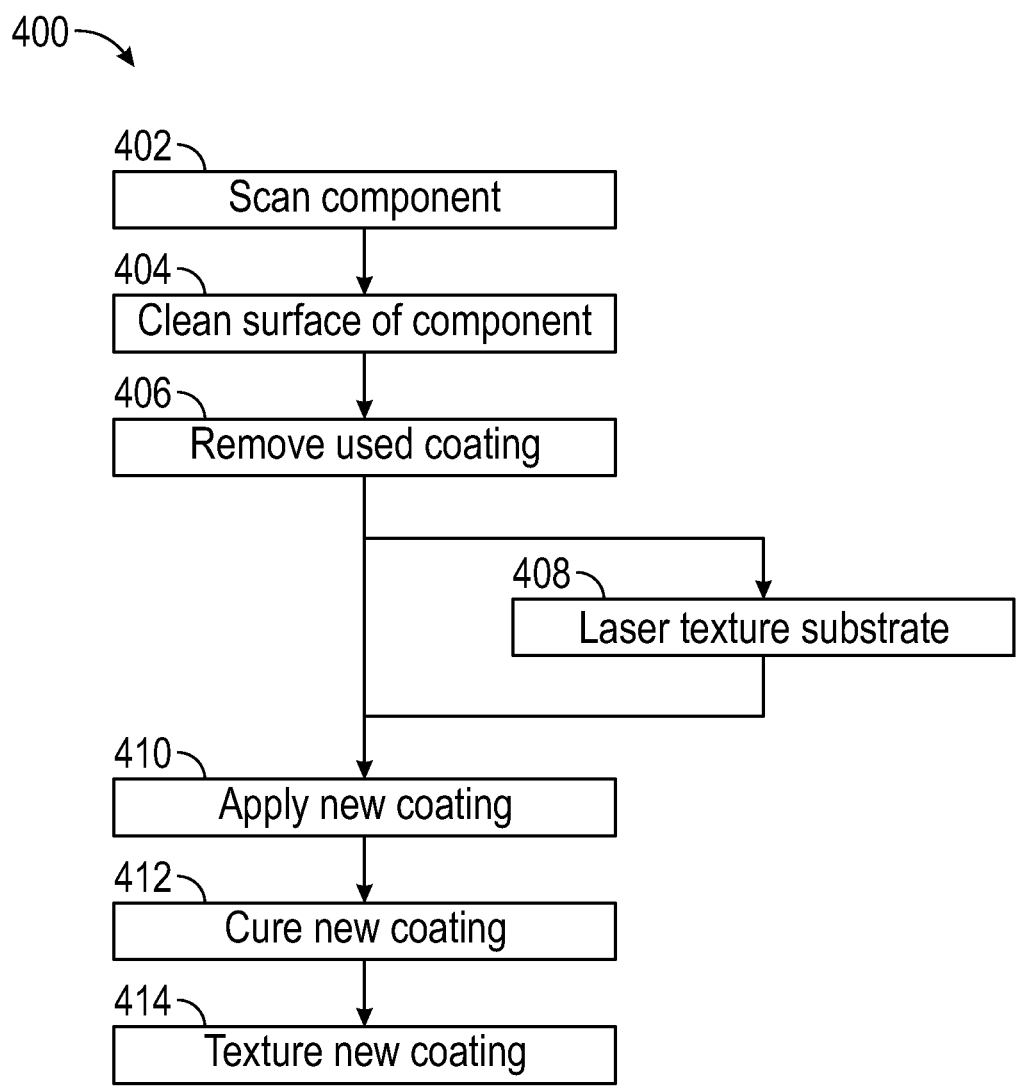
FIG. 4 is a flow process for a component treatment operation in accordance with an embodiment of the present disclosure.

Referring now to FIG. 4, a process 400 for treating a component in accordance with an embodiment of the present disclosure is shown. The process 400 may be performed using a system such as shown and described above and to perform the illustrative process shown and described with respect to FIGS. 3A-3F. It will be appreciated that the flow process 400 may be performed using alternative systems, configurations, components, or the like, in addition to that shown and described herein.

At block 402, a component to be treated is scanned. The scanning may be performed using the onboard sensors and/or sensor array of the robot or system. The scanning may be performed to identify various component and/or coating properties prior to performing any operations thereof. The scan may be used to identify locations of foreign matter, identify the thickness of one or more layers on the component, determine locations of wear that may require reapplication of a coating, scan for three-dimensional positioning of the component or treatment arm during a maintenance operation, or the like.

At block 404, a laser applicator of the system is used to clean a surface of the component. The cleaning operation may be performed to remove foreign matter and/or reduce a coating layer from a non-uniform thickness to a uniform thickness in preparation of further treatment. The cleaning operation may be performed using a first energy application from a laser applicator. The first energy application may be a specific configuration of the laser applicator to project a specific power level, wavelength, frequency, amplitude, or the like of a laser that is directed to a surface of the component to perform the cleaning operation. In some embodiments, the power level of the first energy application may be selected to remove foreign matter but not penetrate or otherwise impact a coating of the component. In other embodiments, the power level of the first energy application may be selected to remove both foreign matter and a portion of a coating that is present on the component when scanned at block 402, for example (i.e., a used or pre-existing coating on the component).

At block 406, a coating layer on the component is removed. The removal of the coating layer refers to the removal of a pre-existing or used coating that is present on the component. It will be appreciated that if the process 400 is used for treating a new component (i.e., applying a new coating), blocks 404 and 406 may be omitted. The removal of the used coating may be performed using a second energy application from the laser applicator. The second energy application may be performed with a laser having different properties or characteristics than the first energy application. For example, the power level, frequency, wavelength, amplitude, etc. may be changed as compared to the first energy application. The specific laser properties for the operation of block 406 may be selected to ablate or otherwise remove the used coating. In some configurations the laser properties may be selected to remove one or more specific, identified layers or coating on the component, but selected to not damage or otherwise impact any layers, surfaces, coatings, etc. that may be below or beneath the layer(s) to be removed. With the application of the second energy application, the component will be left with a prepared surface that has removed any foreign matter and any used or desired coatings/layers, and preparation for application of a new coating may be made.

For example, optionally, at block 408, the laser applicator may be used to pretreat the surface to which a new coating will be applied. The surface may be a surface of the component or may be a sub-layer, such as a base coating layer or the like. At block 408, a third energy application may be performed to texture the surface to be coated. For example, a roughness or textured pattern may be formed on the surface to be coated. The third energy application may be performed with a laser having different properties or characteristics than the first and/or second energy applications. For example, the power level, frequency, wavelength, amplitude, etc. may be changed as compared to the first and/or second energy applications. The specific laser properties for the operation of block 408 may be selected to cut into or otherwise form texturing on the surface to be coated.

At block 410, the system changes from laser application to coating application and a new coating is applied to the surface to be coated. At block 410, the system may change from a laser operation to a spray coating operation which dispenses coating material onto the surface to be treated. The coating applicator of the system may be an ultrasonic spray applicator to dispense coating material onto the surface to be treated. In some embodiments, multiple coating layers may be applied at block 410. In such configurations, the coating layers may be of the same or different coating materials.

At block 412, an optional curing step may be performed. The curing step of block 412 may be performed using the laser applicator after the coating of block 410 is applied. The curing step may be performed using a fourth energy application. The fourth energy application may be a laser application having one or more properties different from the energy applications of blocks 404, 406, 408. The curing step may be used to ensure that the new coating that is applied at block 410 is hardened, fused to the surface of the component or sublayer, or otherwise treated to achieve a desired result.

At block 414, an optional coating texturing step may be performed. The texturing of the new coating may be performed using a fifth energy application. The fifth energy application may be a laser application having one or more properties different from the energy applications of blocks 404, 406, 408, 412. The texturing of the newly applied coating may be to achieve a desired surface texture or feature with the new coating. In some embodiments that may require multiple different coating applications, the coating texturing step of block 414 may be performed for the similar purpose at block 408, to improve an application of a coating thereto.

As noted, blocks 404, 406, 408, 412, and 414 may be optional steps, depending on the specific operation and application being performed. Further, a scanning of the component and/or surfaces may be performed before and/or after each operation of the process 400. For example, after block 404 is performed to remove foreign matter, for example, the surface may be scanned to ensure that all or an acceptable level foreign matter has been removed. If additional cleaning is necessary, the system may perform the step of block 404 again. Similarly, after block 406, a scan may be performed to confirm that the old/used coating has been fully removed, and if not, further application of the second energy application may be performed. The above may be true for any step of the process 400 to confirm completion of the individual steps. In some embodiments, because the sensors or sensor array may be arranged on the same treatment arm as the laser applicator and/or coating applicator, the scanning and monitoring may be performed in real-time and simultaneously or nearly simultaneously as the operational steps described above. Further, in some configurations of the present disclosure, the order of steps of process 400 may be changed, without departing from the scope of the present disclosure. For example, the cleaning step of block 404 and the removing of the used/old coating of block 406 may be interchanged in order or alternated and repeated. For example, in one alternative embodiment, the old coating may be removed (block 406) and the newly exposed surface cleaned (block 404). In still another embodiment, the process may involve a first cleaning step (block 404) followed by removal of a coating or layer (block 406) followed by an additional cleaning step (block 404). Such additional cleaning step may be performed to ensure that any possible debris from the removing step (block 406) is completely removed from the surface that is cleaned and prepared for application of a new coating.

Advantageously, embodiments described herein provide for coating systems and methods capable of rapid, selective, precise, hazardous-chemical-free coating removal and energy-efficient, low-waste application of coatings to components. In accordance with some embodiments, such systems may be integrated into or on a compact, portable robotic platform. In such platforms, various components (e.g., laser applicator, coating applicator, and sensors) may be arranged on one or more arms of the robotic platform, such that an integrated solution is provided. The systems described herein may result in significant environmental benefits due to waste generation reductions during coating applications. For example, benefits of the systems described herein may result in savings of more than 50% of product surface cleaning cost over standard processes. Further, advantageously, embodiments of the present disclosure can result in processing cost reductions due to increase in system efficiency and reductions in production time by at least 50%. Further, advantageously, coating quality improvements may be achieved, such as, coating thickness uniformity. Additionally, coating functionality may be improved through controlled laser surface treatment, by controlling operation of the laser applicator and coating applicator in combination with feedback from integrated sensors and/or sensor arrays. Moreover, embodiments of the present disclosure can achieve scalability using multiple robotic systems operating simultaneously due to the compact system size through integration of laser, coating, and sensor combinations as described herein.

Embodiments of the present disclosure may achieve a reduction of hazardous waste generation by more than 50% during both coating removal and application as compared to conventional coating systems. In addition, embodiments of the present disclosure may be implemented in a relatively compact system size, providing scalability when multiple robotic systems are operated simultaneously. Further, advantageously, precision control of surface roughness and thickness may be achieved, as well as controlled surface texturing, resulting from the high accuracy and repeatability of coating removal and application created by feedback control from the in situ sensor assembly and/or suite. Further, advantageously, embodiments of the present disclosure provide for the ability to selectively strip down to a selected coating or layer, even if multiple coating layers are present, due to the high accuracy of the pulsed laser system and the sensitivity of the on-board sensor array (e.g., acoustic and XRD sensors) to layers below the surface of the outermost layer or substrate.

Embodiments of the present disclosure may employ the use of a kilowatt-scale nanosecond pulsed laser system instead of a higher power (6 KW) continuous wave laser system that has been typically used previously. This may result in a reduction in power consumption and reduced thermal effects on the substrate by the laser system. For coating application, robotic painting using the systems described herein may reduce worker exposure to chemicals and increase maintenance efficiency. Further, the ultrasonic spray coating of some embodiments of the present disclosure, can reduce waste through an increase in transfer efficiency and, resulting from the uniformity of the ultrasonic spray application, a reduction in excess paint application. In accordance with some embodiments, non-chromate spray-based primer coatings may be employed with some applications of the present disclosure.

Furthermore, the combination of coating removal and coating application into a single system, as described herein, can result in rapid surface texturing of fresh coatings, an may also result in capabilities not previously considered, such as immediate laser curing of sprayed coatings. In addition, by combining coating removal and application into one system, a greater return on investment is possible on the costs of developing and procuring the system.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. As used herein, the terms "about" and "substantially" are intended to include the degree of error associated with measurement of the particular quantity based upon the equipment available at the time of filing the application. For example, the terms may include a range of +8%, or 5%, or 2% of a given value or other percentage change as will be appreciated by those of skill in the art for the particular measurement and/or dimensions referred to herein.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description but is only limited by the scope of the appended claims.

What is claimed is:

1. A method for treating a component using a system comprising a controller configured to control operation of a laser applicator, a coating applicator, and a sensor array, wherein the laser applicator, the coating applicator, and the sensor array are arranged on a treatment arm, the method comprising:
    scanning a surface to be treated of the component using the sensor array;
    cleaning the surface to be treated using the laser applicator;
    applying a new coating to the surface to be treated using the coating applicator; and
    monitoring the cleaning and applying operations using the sensor array during the cleaning of the surface and applying the new coating; and
    performing an active feedback control using the controller based on the monitoring during the cleaning of the surface and applying the new coating, wherein the active feedback utilizes physics-based models to control the laser applicator during the cleaning and the coating applicator during the coating.

2. The method of claim 1, wherein the applying of the new coating comprises an ultrasonic spray application.

3. The method of claim 1, wherein the cleaning is performed using a pulsed laser.

4. The method of claim 1, further comprising removing an existing coating on the component, using the laser applicator, prior to the cleaning.

5. The method of claim 4, wherein the cleaning is performed using a first energy application of the laser applicator and the removing of the existing coating is performed using a second energy application of the laser applicator that is different from the first energy application.

6. The method of claim 4, further comprising texturing the surface to be treated, using the laser applicator, after the cleaning and before the applying of the new coating.

7. The method of claim 6, wherein the cleaning is performed using a first energy application of the laser applicator and the texturing of the surface to be treated is performed using an energy application of the laser applicator that is different from the first energy application.

8. The method of claim 1, further comprising curing the new coating using the laser applicator.

9. The method of claim 8, wherein the cleaning is performed using a first energy application of the laser applicator and the curing of the new coating is performed using an energy application of the laser applicator that is different from the first energy application.

10. The method of claim 1, further comprising texturing the new coating using the laser applicator.

11. The method of claim 10, wherein the cleaning is performed using a first energy application of the laser applicator and the texturing of the new coating is performed using an energy application of the laser applicator that is different from the first energy application.

12. The method of claim 1, wherein the cleaning comprises applying a first energy application from the laser applicator to clean the surface to be treated, the method further comprising:
    removing a coating on the component by applying a second energy application that is different from the first energy application, after the scan and after the cleaning; and
    curing the new coating by applying a third energy application that is different from the first energy application and the second energy application.

13. The method of claim 12, further comprising:
    texturing the surface to be treated by applying an additional energy application after the removing of the coating and prior to applying the new coating, wherein the additional energy application is different from the first energy application, the second energy application, and the third energy application.

14. The method of claim 12, further comprising:
    texturing the new coating by applying an additional energy application after applying the new coating, wherein the additional energy application is different from the first energy application, the second energy application, and the third energy application.

15. A system for treating a component, the system comprising:
    a treatment arm having a laser applicator, a coating applicator, and a sensor array; and
    a controller in operable communication with each of the laser applicator, the coating applicator, and the sensor array,
    wherein the controller is configured to control the laser applicator and the coating applicator to perform a treatment operation of a surface of the component in response to information obtained from the sensor array, wherein the treatment operation comprises:
    scanning a surface to be treated of the component using the sensor array;
    cleaning the surface to be treated using the laser applicator;
    applying a new coating to the surface to be treated using the coating applicator;
    monitoring the cleaning and applying operations using the sensor array during the cleaning of the surface and applying the new coating; and
    performing an active feedback control using the controller based on the monitoring during the cleaning of the surface and applying the new coating, wherein the active feedback utilizing physics-based models to control the laser applicator and the coating applicator.

16. The system of claim 15, wherein the laser applicator is a pulsed laser applicator and the coating applicator is an ultrasonic spray applicator.

17. The system of claim 15, wherein the treatment operation further comprises:
   removing an existing coating on the component prior to the cleaning using the laser applicator.

18. The system of claim 17, wherein the cleaning step is performed using a first energy application of the laser applicator and the removing of the existing coating is performed using a second energy application of the laser applicator that is different from the first energy application.

19. The system of claim 17, wherein the treatment operation further comprises at least one of:
   texturing the surface to be treated after the cleaning and before the applying of the new coating; and
   texturing the new coating after application thereof.

20. The system of claim 19, wherein the cleaning step is performed using a first energy application of the laser applicator and the texturing of the surface to be treated is performed using an energy application of the laser applicator that is different from the first energy application.

* * * * *